United States Patent [19]

Tamura

[11] Patent Number: 4,562,565
[45] Date of Patent: Dec. 31, 1985

[54] TRACKING SERVO SYSTEM
[75] Inventor: Kunio Tamura, Tokorozawa, Japan
[73] Assignee: Pioneer Electronic Corporation, Tokyo, Japan
[21] Appl. No.: 417,497
[22] Filed: Sep. 13, 1982
[30] Foreign Application Priority Data Sep. 14, 1981 [JP] Japan .......................... 56-135433[U]

[51] Int. Cl.$^4$ .............................................. G11B 21/10
[52] U.S. Cl. ........................................ 369/44; 369/46; 369/111; 250/202
[58] Field of Search ................ 369/46, 45, 44, 43, 369/111, 124, 174, 175; 250/201, 202; 360/77

[56] References Cited

U.S. PATENT DOCUMENTS 4,005,260 1/1977 Janssen .................................. 369/44
4,152,550 5/1979 Takahashi ........................... 369/175
4,340,950 7/1982 Kosaka .................................. 369/124

Primary Examiner—Alan Faber

[57] ABSTRACT

A tracking servo system of a recording-disc reading and reproducing apparatus in which the information carried on a recording disc adapted to be driven for rotation is scanned by a signal pickup point displaced radially of the disc, comprising tracking error signal generator operative to detect an amount of deviation, if any, of the signal pickup medium from a target track on an information-carrying surface of the recording disc and produce a tracking error signal representative of the detected amount of deviation, and band eliminator such as a notch filter operative to eliminate a predetermined frequency in the tracking error signal.

4 Claims, 5 Drawing Figures

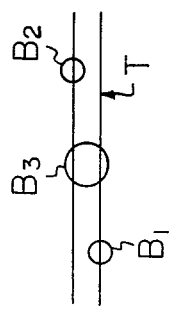
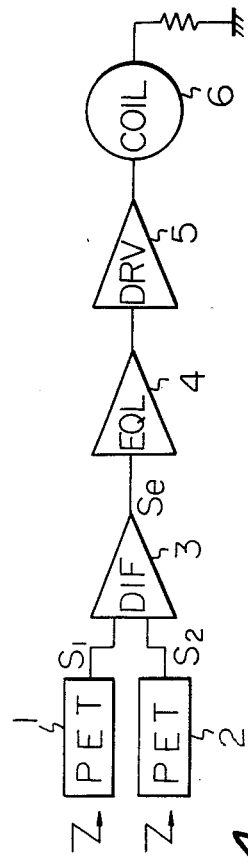
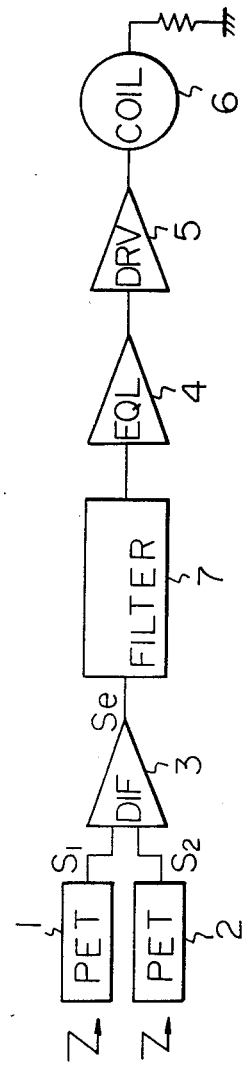
Fig. 1
Fig. 2 PRIOR ART
Fig. 4

TRACKING SERVO SYSTEM

FIELD OF THE INVENTION

The present invention relates to a tracking servo system of a recording-disc reading and reproducing apparatus in which the information carried on a recording disc driven for rotation is read by a signal pickup means providing a pick-up point, such as a beam spot in the case of the optical type on an information-carrying surface of the recording disc and for displacing the pick-up point radially of the disc.

SUMMARY OF THE INVENTION

In accordance with one important aspect of the present invention, there is provided a tracking servo system of a recording-disc reading and reproducing apparatus in which the information carried on a recording disc having an information-carrying surface and driven for rotation about the center axis thereof is scanned by a signal pickup point displaced radially of the disc, comprising tracking error signal generating means operative to detect an amount of deviation, if any, of the signal pickup point from a target track on the information-carrying surface of the recording disc and produce a tracking error signal representative of the detected amount of deviation, and band eliminating means operative to eliminate a predetermined frequency in the tracking error signal.

In accordance with another important aspect of the present invention, there is provided a tracking servo system of a recording-disc reading and reproducing apparatus wherein the information carried on a recording disc which has an information-carrying surface formed with record tracks and which is driven for rotation about the center axis thereof is scanned by a scanning beam focused on an information-carrying surface of the recording disc and displaced radially of the disc, comprising index-beam emitting means for emitting two index beams onto the information-carrying surface of the recording disc and having the index beams focused at spots spaced apart a predetermined distance tangentially of the record tracks, photoelectric transducer means for converting the optical signals contained in the index beams focused on the recording disc into electric signals, respectively, corresponding to the optical signals, error signal generating means operative to detect a difference, if any, between the levels of the electric signals and produce a tracking error signal representative of the detected difference, and band eliminating means operative to eliminate a predetermined frequency in the tracking error signal, the frequency being selected depending upon the speed of rotation of the disc and the distance between the focused spots of the index beams.

In a tracking servo system according to the present invention as set forth above, the band eliminating means may comprise a notch filter or a low-pass filter connected to the output terminal of the tracking error signal generating means.

BRIEF DESCRIPTION OF THE DRAWINGS

The drawbacks of a prior-art tracking servo system reproducing apparatus and the features and advantages of a tracking servo system according to the present invention will be more clearly understood from the following description taken in conjunction with the accompanying drawings in which:

FIG. 1 is a schematic view showing locations of focused spots of scanning and index beams radiated onto an information-carrying surface of a recording disc in a recording-disc reading and reproducing apparatus;

FIG. 2 is a block diagram showing a representative example of a prior-art tracking servo system of a recording-disc reading and reproducing apparatus;

FIG. 4 is a block diagram similar to FIG. 2 but shows a preferred embodiment of a tracking servo system according to the present invention.

DESCRIPTION OF THE PRIOR ART

Figure 3:
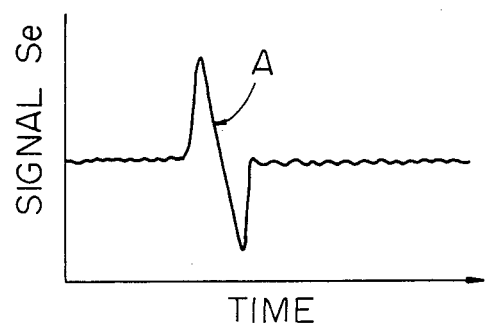
FIG. 3 is a graph showing a waveform of a tracking error signal produced when a foreign substance such as dust is deposited on an information-carrying surface of a recording disc during operation of a recording-disc reading and reproducing apparatus incorporating the prior-art tracking servo system shown in FIG. 2.

In order to produce signals to control the tracking servo system of a recording-disc reading and reproducing apparatus such as a video disc player or a digital audio disc player of the optically scanning type, two index beams of laser light are radiated onto an information-carrying surface of a recording disc, in addition to a scanning beam to reproduce the information carried on the disc. The three beams of light are focused at points located in predetermined relationship to one another on the information-carrying surface of the recording disc. FIG. 1 shows an example of such a relationship among the focused spots of the beams, wherein the focused spots of the index beams are denoted by $B_1$ and $B_2$ and the focused spot of the scanning beam is denoted by $B_3$. In the example herein shown, the three beams of light are assumed to be directed at a target track T on the information-carrying surface of the recording disc so that one of the focused spots $B_1$ and $B_2$ overlaps the target track T over one half of the spot and the other focused spot overlaps the target track T over the other half of the spot if the focused spot, that is the pick-up spot $B_3$ of the scanning beam is correctly located on the target track T. When the focused spots $B_1$, $B_2$ and $B_3$ of the index and scanning beams of light are thus located with respect to the target track T, the signal level of the information reproducing signal resulting from the beam of light reflected from or passed through the focused spot $B_3$ of the scanning beam assumes a maximum value.

The index beams reflected from or passed through the recording disc at the focused spots $B_1$ and $B_2$ are supplied to photoelectric transducer elements 1 and 2 (PET), respectively, shown in FIG. 2. The optical signals contained in the beams of light thus supplied to the transducer elements 1 and 2 are converted into electric signals $S_1$ and $S_2$ respectively corresponding to the original optical signals. The electric signals respectively produced by the transducer elements 1 and 2 are fed to a differential amplifier 3 which is adapted to produce, through detection of the difference between the levels of the signals $S_1$ and $S_2$, a tracking error signal Se representative of amount and direction of deviation, if any, of the scanning beam from the target track T on the recording disc. If the focused spot $B_3$ of the scanning beam radiated onto the information-carrying surface of the recording disc is correctly located on the target track T as shown in FIG. 1, the levels of the signals $S_1$ and $S_2$ produced by the photoelectric transducer elements 1 and 2 are equalized in absolute value so that the tracking error signal Se assumes a zero level. The tracking error signal Se thus produced by the differential amplifier 3 is fed through an equalizer circuit 4 (EQL) and a driver circuit 5 to a control coil 6 of a tracking mirror unit. The transducer elements 1 and 2, differential amplifier 3, equalizer circuit 4, driver circuit 5 and control coil 6 constitute a tracking servo loop, which is thus operative to control the tracking mirror in such a manner as to eliminate the difference between the levels of the output signals $S_1$ and $S_2$ from the transducer elements 1 and 2. The tracking servo loop usually has further included therein a phase lead network (not shown) so as to provide stabilized performance characteristics of the loop.

When it happens that an foreign substance such as dust is deposited on an information-carrying surface of a recording disc during playback of the disc, the tracking error signal Se produced in the tracking servo loop as described above shows an abrupt fluctuation as indicated at A in FIG. 3 when the foreign substance is detected by the scanning beam of light. When such a fluctuation takes place, the tracking servo loop becomes saturated and may cause a jump over a target track or provide an unduly prolonged dropout. Since the fact that phase-lead compensation is effected in the tracking servo loop as discussed above, increased gains are produced at relatively high frequencies and form another cause of a jump over a target track. The present invention comtemplates provision of a tracking servo system which is free from these problems encountered in a prior-art tracking servo loop of a recording-disc reading and reproducing apparatus.

DESCRIPTION OF THE PREFERRED EMBODIMENTS

Referring to FIG. 4 of the drawings, a tracking servo system embodying the present invention is basically similar to the prior-art tracking servo system described with reference to FIG. 2 and, thus, comprises photoelectric transducer elements 1 and 2, a differential amplifier 3, an equalizer circuit 4, and a driver circuit 5. The transducer elements 1 and 2 are supplied with beams of light reflected from or passed through an information-carrying surface of a recording disc during playback of the disc and are operative to convert the optical signals contained in the beams into electric signals $S_1$ and $S_2$, respectively, corresponding to the former. The differential amplifier 3 is responsive to the output signals $S_1$ and $S_2$ from the transducer elements 1 and 2 and is operative to produce, through detection of the difference between the levels of the signals $S_1$ and $S_2$, a tracking error signal Se representative of amount and direction of deviation, if any, of the scanning beam from the target track on the recording disc. The tracking error signal Se thus produced by the differential amplifier 3 is fed through the equalizer and driver circuits 4 and 5 to a control coil 6 of a tracking mirror unit. The tracking servo system embodying the present invention may further comprise a phase lead network (not shown) to provide stabilized performance characteristics of the servo system.

The tracking servo system embodying the present invention further comprises band eliminating means constituted by a notch filter 7 which is connected between the differential amplifier 3 and the equalizer circuit 4 as shown. The frequency to be eliminated by the notch filter 7, that is a trap frequency, is selected depending upon the distance between the focused spots $B_1$ and $B_2$ (FIG. 1) of the index beams radiated onto the recording disc, and the circumferential or line speed of rotation of the recording disc with respect to the pick-up spot. If, for example, the tangential distance between the focused spots $B_1$ and $B_2$ of the index beams is 60 $\mu$m and the recording disc is driven for rotation at a circumferential or line speed of 1.25 m/sec, with respect to the pick-up spot the frequency to be eliminated by the notch filter 7 is selected at 10 kHz since the period of time for which a point on the information-carrying surface of the recording disc is displaced between the focused spots $B_1$ and $B_2$ is 48 $\mu$s.

Figure 5:
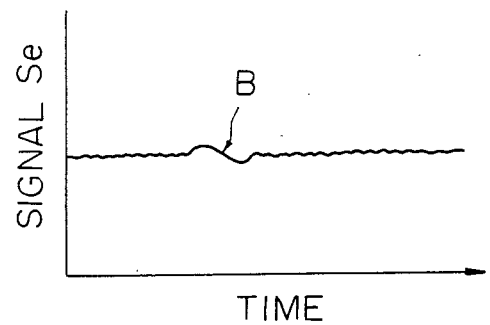
FIG. 5 is a graph showing a waveform of a tracking error signal produced when a foreign substance is deposited on an information-carrying surface of a recording disc during operation of a recording-disc reading and reproducing apparatus using the servo system embodying the present invention.

When a foreign substance such as dust is deposited on the information-carrying surface of a recording disc being played back in a recording-disc reading and reproducing apparatus using the tracking servo system embodying the present invention, the abrupt fluctuation caused in the tracking error signal Se is filtered by the notch filter 7 and is moderated as indicated at B in FIG. 5. The tracking servo system is thus prevented from being saturated and provides stabilized tracking performance.

If the fundamental frequency of the fluctuations in the tracking error signal Se as caused by a foreign substance deposited on a recording disc is in the vicinity of 10 kHz, the notch filter 7 provided in the tracking servo system embodying the present invention may be substituted by a low-pass filter to eliminate frequencies higher than 10 kHz. In this instance, design considerations should be paid to provide stability of performance of the tracking servo loop to cope with the rotation of the phase as caused by the provision of the low-pass filter.

What is claimed is:

1. In a tracking servo system of a recording-disc reading apparatus in which a recording disc having an information-carrying surface is rotatably driven about the center axis of said disc and is read by a signal pickup point displaced radially of the disc and directed onto said information-carrying surface, the line velocity of said signal pickup point relative to said information-carrying surface being kept constant notwithstanding the radial position of said signal pickup point with respect to said disc, the improvement comprising:
    a tracking error signal generating means is operative to detect an amount and direction of deviation, if any, of the signal pickup point from a target track on the information-carrying surface of the recording disc and produce a tracking error signal representative of the detected amount and direction of deviation, said tracking error signal generating means being adapted to provide a pair of index points respectively residing at both sides of said signal pick-up point and to produce a pair of signals respectively representing distances of said index points from said target track, and
    a band eliminating means operative to eliminate a predetermined frequency in the tracking error signal, said predetermined frequency being selected depending upon the line velocity of rotation of the recording disc and the tangential distance between the index points.

2. A tracking servo system as defined by claim 1, in which said band eliminating means comprises a notch filter having a trap frequency equal to said predetermined frequency.

3. A tracking servo system as defined by claim 1, in which said band eliminating means comprises a low-pass filter having a cut off frequency higher than said predetermined frequency.

4. A tracking servo system as defined in claim 1, in which said tracking error signal generating means includes:
   index beam emitting means for emitting two index beams onto the information-carrying surface of said recording disc and having the index beams focused at spots spaced apart a predetermined distance tangentially of the record tracks,
   photoelectric transducer means for converting the optical signals contained in the index beams focused onto the information-carrying surface into electric signals, respectively corresponding to the optical signals, and
   means for producing a tracking error signal representative of the difference between the levels of said electric signals.

* * * * *